(12) United States Patent
Kuragaki et al.

(10) Patent No.: US 12,315,969 B2
(45) Date of Patent: May 27, 2025

(54) LAMINATED BODY FOR FUEL CELL (71) Applicant: TOYOBO CO., LTD., Osaka (JP)

(72) Inventors: Masahiro Kuragaki, Otsu (JP); Ai Koganemaru, Otsu (JP); Yoshitaka Tanaka, Inuyama (JP); Shigeyuki Watanabe, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 622 days.

(21) Appl. No.: 17/634,152

(22) PCT Filed: Aug. 27, 2020

(86) PCT No.: PCT/JP2020/032374
§ 371 (c)(1),
(2) Date: Feb. 9, 2022

(87) PCT Pub. No.: WO2021/044940
PCT Pub. Date: Mar. 11, 2021

(65) Prior Publication Data
US 2022/0293971 A1 Sep. 15, 2022

(30) Foreign Application Priority Data
Sep. 6, 2019 (JP) ................................. 2019-162855

(51) Int. Cl.
| | | |
|---|---|---|
| *B32B 27/08* | (2006.01) | |
| *B32B 27/28* | (2006.01) | |
| *B32B 27/32* | (2006.01) | |
| *B32B 27/36* | (2006.01) | |
| *H01M 8/0273* | (2016.01) | |
| *H01M 8/0284* | (2016.01) | |

(52) U.S. Cl.
CPC .......... *H01M 8/0284* (2013.01); *B32B 27/08* (2013.01); *B32B 27/286* (2013.01); *B32B 27/32* (2013.01); *B32B 27/36* (2013.01); *H01M 8/0273* (2013.01); *B32B 2307/54* (2013.01); *B32B 2307/732* (2013.01); *B32B 2457/18* (2013.01)

(58) Field of Classification Search
None
See application file for complete search history.

(56) References Cited

U.S. PATENT DOCUMENTS

| | | | | |
|---|---|---|---|---|
| 2017/0088324 | A1* | 3/2017 | Sasaki | ................... H01L 31/206 |
| 2017/0229718 | A1 | 8/2017 | Taguchi et al. | |
| 2017/0229719 | A1 | 8/2017 | Lai et al. | |

FOREIGN PATENT DOCUMENTS

| | | | |
|---|---|---|---|
| JP | H05-021077 | A | 1/1993 |
| JP | H09-289028 | A | 11/1997 |
| JP | 2007-250249 | A | 9/2007 |
| JP | 2008-091170 | A | 4/2008 |
| JP | 2011-003289 | A | 1/2011 |
| JP | 2013-110048 | A | 6/2013 |
| JP | 2014-120248 | A | 6/2014 |
| JP | 2016-088023 | A | 5/2016 |
| JP | 2017-162795 | A | 9/2017 |
| JP | 6285701 | B2 | 2/2018 |
| JP | 6375523 | B2 | 8/2018 |
| WO | WO 2016/076189 | A1 | 5/2016 |

OTHER PUBLICATIONS

Idemitsu Kosan, "SPS Biaxially Stretched Film" [accessed at https://www.idemitsu.com/jp/business/ipc/products/sps/oshidashi/nizikuenshin_2.html].
Nishiyama, "Evaluation of Kinetic Viscooelasticity of Solid Polymers," *Network Polymer*, 32(6): 362-367 (2011).
Takashu, "Technology for Stretching Plastic Films and Evaluation," published by Technical Information Institute Co., Ltd. (1992).
Toray Industries, Inc., "Technical Information for Torelina® Polyphenylene Sulfide Film" (1995).
Ishikawa, "Results of the Measurement of the Storage Moduli," submitted in support of the opposition to the grant of a patent for Japanese Patent Application No. 2021-543725 (Aug. 10, 2023).
Japan Patent Office, Opposition to the Grant of a Patent for Japanese Patent Application No. 2021-543725 (Aug. 10, 2023).
Japan Patent Office, Decision on Opposition in Japanese Patent Application No. 2021-543725 (Oct. 20, 2023).
European Patent Office, Extended European Search Report in European Patent Application No. 20860884.4 (Sep. 22, 2022).
Japanese Patent Office, International Search Report in International Patent Application No. PCT/JP2020/032374 (Nov. 10, 2020).

* cited by examiner

*Primary Examiner* — Sheeba Ahmed
(74) *Attorney, Agent, or Firm* — Leydig, Voit & Mayer, Ltd.

(57) ABSTRACT

The invention provides a laminated body for fuel cell having an outer peripheral shape corresponding to an outer peripheral shape of a fuel battery cell and including a resin substrate film and a heat seal layer disposed on each of both surfaces of the resin substrate film, wherein the resin substrate film has a storage elastic modulus of 2,000-8000 MPa, an average thickness of 30-300 μm, a maximum value $T1_{max}$ and a minimum value $T1_{min}$ of a thickness of the resin substrate film that satisfies the relationship of $T1_{max} - T1_{min} \leq 12$ μm, and a maximum value $T2_{max}$ and a minimum value $T2_{max}$ of an average value of thicknesses of the resin substrate film that satisfies the relationship of $T2_{max} - T2_{min} \leq 6$ μm, and wherein the heat seal layer has an average thickness of 25-100 μm.

14 Claims, 1 Drawing Sheet

LAMINATED BODY FOR FUEL CELL

TECHNICAL FIELD

The present disclosure relates to a laminated body for fuel cell having an outer peripheral shape corresponding to the outer peripheral shape of a fuel battery cell, and a long laminated body used for manufacturing the laminated body for fuel cell.

BACKGROUND ART

A fuel cell generally includes a membrane electrode assembly (MEA) in which an electrode is provided on each of both surfaces of an electrolyte membrane. For example, in an MEA included in a solid polymer fuel cell which is a type of fuel cell, a solid polymer membrane (electrolyte membrane) is disposed between a fuel electrode (negative electrode) and an oxygen electrode (positive electrode). A structure in which minimum units (referred to as "cell") including the MEA are laminated is referred to as a fuel cell stack (hereinafter, may be simply referred to as "stack").

The MEA is usually disposed between the pair of separators. The separator is a member which partitions the cells included in the fuel cell stack. A seal member is provided between the separator and the separator along the outer periphery of the MEA in order to suppress the leakage of a reaction gas.

As the seal member, for example, a rubber (see, for example, Patent Document 1), a prepreg in which a glass fiber is impregnated with an epoxy resin (see, for example, Patent Document 2), and an elastomer seal (see, for example, Patent Document 3) have been known. A seal member including a core layer composed of a thermoplastic resin and skin layers formed on both surface layers of the core layer brought into contact with a pair of separators has also been known (see, for example, Patent Document 4).

PRIOR ART DOCUMENTS

Patent Document

Patent Document 1: JP-B-6285701
Patent Document 2: JP-B-6375523
Patent Document 3: JP-A-2017-162795
Patent Document 4: JP-A-2014-120248

SUMMARY OF THE INVENTION

Problems to be Solved by the Invention

In the process of manufacturing the fuel cell stack, a predetermined load is usually applied to each of the cells. It is considered that the seal member is sandwiched and deformed between the separators to enhance adhesiveness between the separators. However, when a seal member such as a rubber having low rigidity is used, the uniformity of distances between the separators may be deteriorated. Since it is necessary to laminate a large number of cells in the manufacturing process of the fuel cell stack, the uniformity between the separators in each of the cells may have a great influence on the dimensional stability of the fuel cell stack. For example, in Patent Document 4, the distance between the separators is defined by using the seal member including the core layer and the pair of skin layers. However, even when the seal member including the core layer and the skin layer is used, there is room for improvement in the uniformity of the distances between the separators in the fuel cell stack.

The present disclosure has been made in view of the above circumstances.

An object of one aspect of the present disclosure is to provide a laminated body for fuel cell which improves the uniformity of distances between separators when applied to a fuel cell stack. Another aspect of the present disclosure is to provide a long laminated body which can be manufactured by cutting out the laminated body for fuel cell which improves the uniformity of distances between separators when applied to a fuel cell stack.

Means for Solving the Problems

The present disclosure includes the following aspects.

<1> A laminated body for fuel cell having an outer peripheral shape corresponding to an outer peripheral shape of a fuel battery cell, the laminated body for fuel cell including: a resin substrate film; and a heat seal layer disposed on each of both surfaces of the resin substrate film, wherein the resin substrate film has a storage elastic modulus of 2,000 MPa to 8,000 MPa, the resin substrate film has an average thickness of 30 μm to 300 μm, a maximum value $T1_{max}$ and a minimum value $T1_{min}$ of a thickness of the resin substrate film measured in a peripheral edge portion of the resin substrate film satisfy a relationship of $T1_{max}$ $T1_{min}$≤12 μm, a maximum value $T2_{max}$ and a minimum value $T2_{min}$ of an average value of thicknesses of the resin substrate film measured at every 10 adjacent points in the peripheral edge portion of the resin substrate film satisfy a relationship of $T2_{max}$-$T2_{min}$ 6 μm, and the heat seal layer has an average thickness of 25 μm to 100 μm.

<2> The laminated body for fuel cell according to <1>, wherein a total value of an average thickness of the resin substrate film and an average thickness of the heat seal layer is 80 μm to 500 μm.

<3> The laminated body for fuel cell according to <1> or <2>, wherein a maximum value $T3_{max}$ and a minimum value $T3_{min}$ of a thickness of the heat seal layer measured in a peripheral edge portion of the heat seal layer satisfy a relationship of $T3_{max}$-$T3_{min}$≤8 μm.

<4> The laminated body for fuel cell according to any one of <1> to <3>, wherein the laminated body for fuel cell has a planar shape having at least one opening por ion having a total area ratio of 30 to 90% on an inner side.

<5> The laminated body for fuel cell according to <4>, wherein a maximum value $T4_{max}$ and a minimum value $T4_{min}$ of a thickness of the resin substrate film measured in a peripheral edge portion of a maximum opening portion in the opening portion satisfy a relationship of $T4_{max}$-T4min≤10 μm, a maximum value $T5_{max}$ and a minimum value $T5_{min}$ of an average value of thicknesses of the resin substrate film measured at every 5 adjacent points satisfy a relationship of $T5_{max}$-$T5_{min}$=5 μm, and a difference between an average value $T1_{ave}$ of an cuter peripheral edge portion of the resin substrate film and an average value $T4_{ave}$ of the peripheral edge portion of the maximum opening portion is |$T1_{ave}$-$T4_{ave}$|≤5 μm.

<6> The laminated body for fuel cell according to any one of <1> to <5>, wherein the resin substrate film is a polyethylene naphthalate film, a polystyrene film, a polyphenylene sulfide film, or a polyethylene terephthalate film.

<7> The laminated body for fuel cell according to any one of <1> to <6>, wherein the heat seal layer contains a polyolefin.

<8> A long laminated body used for manufacturing a laminated b for fuel cell, wherein the laminated body for fuel cell according to any one of <I>to <7> can be formed, when a laminated body for fuel cell having a width of 100 mm and a length of 100 mm is cut out from a center position in a transverse direction.

Effect of the Invention

According to one aspect of the present disclosure, it is possible to provide a laminated body for fuel cell which improves the uniformity of distances between separators when applied to a fuel cell stack. According to another aspect of the present I losure, it is possible to provide a long laminated body which can be manufactured by cutting out the laminated body for fuel cell improving the uniformity of distances between separators when applied to a fuel cell stack.

MODE FOR CARRYING OUT THE INVENTION

Hereinafter, embodiments of the present invention will be described. The present disclosure is not limited to the following embodiments at all, and may be implemented with appropriate modifications within the scope of the object of the present disclosure.

the present disclosure, a numerical range represented by "to" means a range including numerical values described before and after "to" as a lower limit value and an upper limit value. In numerical ranges described in a stepwise fashion in the present disclosure, an upper limit value or a lower limit value described in a certain numerical range may be replaced with an upper limit value or a lower limit value of another stepwise described numerical range. In the numerical range described in the present disclosure, the upper limit value or the lower limit value described in a certain numerical range may be replaced with a value shown in Examples.

In the present disclosure, the term "step" includes not only an independent step but also a step which cannot be clearly distinguished from other steps as long as the intended purpose of the step is achieved.

In the present disclosure, when a composition contains a plurality of substances corresponding to each component, the amount of the component in the composition means the total amount of the plurality of substances present in the composition, unless otherwise specified.

In the present disclosure, "% by mass" and "% by weight" are synonymous, and "parts by mass" and "parts by weight" are synonymous.

In the present disclosure, a combination of two or more preferred aspects is a more preferred aspect.
<Laminated Body for Fuel Cell>

A laminated body for fuel cell (hereinafter, may be simply referred to as "laminated body") according to the present disclosure has an outer peripheral shape corresponding to an outer peripheral shape of a fuel battery cell. Here, the "outer peripheral shape corresponding to the outer peripheral shape of the fuel battery cell" is not necessarily limited to the case having the same outer peripheral shape as the outer peripheral shape of the fuel battery cell, and may be any outer peripheral shape including a joining p yon joining the peripheral edge portions of separators constituting the fuel battery cell to each other. For example, the outer peripheral shape of the laminated body for fuel cell is allowed to increase or decrease in size by −50 mm to +50 mm with respect to the outer peripheral shape of the fuel battery cell, but the increase or decrease in size is preferably −10 mm to +10 mm.

The laminated body for fuel cell has such an outer peripheral shape, whereby the peripheral edge portions of the separators constituting the fuel battery cell can be joined to each other in the peripheral edge portion of the laminated body. That is, "for fuel cell" means that the separator is used to at least join the separators constituting the fuel cell to each other.

A membrane-electrode assembly (MEA) in which an electrode is provided on each of both surfaces of an electrolyte membrane is interposed between the separators constituting the fuel battery cell, and the fuel battery cell has a structure in which the MEA is adjacent to the facing separators.

Figure 1:
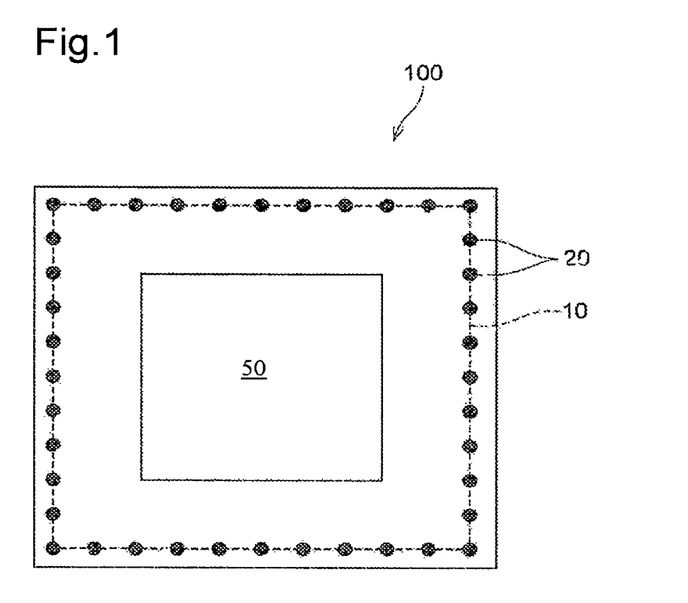
FIG. 1 is a plan view showing an example of a laminated body for fuel cell according to the present disclosure.

Therefore, for example, as shown in FIG. 1, the laminated body for fuel cell preferably has a planar shape having at least one opening portion 50 on an inner side. In this case, the MEA is disposed in the opening portion 50, but it is preferable that the peripheral edge portion of the opening portion 50 and the peripheral edge portion of the MEA are joined by thermal fusion bonding or adhesion or the like. From the viewpoint of suitably performing such joining and joining of the separators, the total area ratio of the opening portion 50 is preferably 30 to 90%, and preferably 35 to 85%, based on the outer peripheral shape of the laminated body for fuel cell.

The laminated body for fuel cell according to the present disclosure includes: a resin substrate film; and a heat seal layer disposed on each of both surfaces of the resin substrate film, wherein the resin substrate film has a storage elastic modulus of 2,000 MPa to 8,000 MPa, the resin substrate film has an average thickness of 30 μm to 300 μm, a maximum value $T1_{max}$ and a minimum value $T1_{min}$ of a thickness of the resin substrate film measured in a peripheral edge portion of the resin substrate film satisfy a relationship of $T1_{max}-T1_{min} \leq 12$ μm, a maximum value and a minimum value $T2_{min}$ of an average value of thicknesses of the resin substrate film measured at every 10 adjacent points in the peripheral edge porton of the resin substrate film satisfy a relationship of $T2_{max}-T2_{min} \leq 6$ μm, and the heat seal layer has an average thickness of 25 μm to 100 μm.

The laminated body for fuel cell according to the present disclosure having the above configuration can improve the uniformity of distances between the separators when applied to a fuel cell stack. The reason why the laminated body for fuel cell according to the present disclosure exhibits the above effects are presumed as follows. As described above, when cells including a seal member such as a rubber having low rigidity are laminated, the uniformity of distances between separators tends to be deteriorated. For example, in Patent Document 4, a core layer whose structure is less likely to change is used, but the low dimensional accuracy of the core layer is considered to make it difficult to suppress deterioration in uniformity between separators. Meanwhile, the resin substrate film applied to the laminated body for fuel cell according to the present disclosure has the above-mentioned characteristics, whereby the resin substrate film has small thickness unevenness and excellent dimensional stability. Therefore, the laminated body for fuel cell according to the present disclosure can improve the uniformity of the distances between the separators when applied to the fuel cell stack.

<<Resin Substrate Film>>

[Storage Elastic Modulus]

The resin substrate film has a storage elastic modulus of 2,000 MPa to 8,000 MPa. When the storage elastic modulus of the resin substrate film is 2,000 MPa or more, the rigidity of the resin substrate film can be improved, whereby the uniformity of the distances between the separators can be improved when the resin substrate film is applied to the fuel cell stack. The resin substrate film has a storage elastic modulus of 2,000 MPa to 8,000 MPa, whereby the resin substrate film has also excellent handleability.

The storage elastic modulus of the resin substrate film is preferably 2,500 MPa or more, more preferably 3,000 MPa or more, and particularly preferably 3,500 MPa or more, from the viewpoint of improving the uniformity of the distances between the separators.

The storage elastic modulus of the resin substrate film is preferably 7,500 MPa or less, more preferably 7,000 MPa or less, and particularly preferably 6,500 MPa or less, from the viewpoint of handleability.

The storage elastic modulus of the resin substrate film is measured by the following method. The resin substrate film is cut to prepare a test piece (width: 5 mm, length: 35 mm). Using a dynamic viscoelasticity measuring device (for example, DMA8000, PerkinElmer Japan Co., Ltd.), the temperature is increased from 20° C. to 30° C. at a frequency of 1 Hz at 1° C./min to measure dynamic viscoelasticity. From the measurement results, a storage elastic modulus at room temperature of 25° C. is obtained.

[Thickness]

The resin substrate film has an average thickness 30 µm to 300 µm. The average thickness of the resin substrate film is within the above range, whereby the dimensional stability and handleability of the resin substrate film can be improved.

The average thickness of the resin substrate film is preferably 50 µm or more, more preferably 60 µm or more, and particularly preferably 70 µm. or more, from the viewpoint of the rigidity of the laminated body to be obtained.

The average thickness the resin substrate film is preferably 280 µm or less, more preferably 260 µm or less, and particularly preferably 240 µm or less, from the viewpoint of a total thickness when the cell and the stack are prepared using the laminated body.

The average thickness of the resin substrate film is measured by the following method. In a plan view, from each section which divides a line (hereinafter, referred to as "inner peripheral line" in this paragraph) passing through a point inwardly spaced by 5 mm from the outer periphery of the laminated body for fuel cell into 40 equal parts, a central portion (length: 5 mm, width: 5 mm) of the inner peripheral line is cut out to obtain 40 test pieces. Here, the preparation of the above-described test piece will be described with reference to the drawings. Fig is a plan view showing an example of a laminated body for fuel cell according to the present disclosure. In a laminated body for fuel cell 100 shown in FIG. 1, from each section which divides an inner peripheral line 10 into 40 equal parts, a central portion 20 of an inner peripheral line is cut out, whereby 40 test pieces can be obtained. Each test piece is fixed in an embedding capsule, and then embedded in an epoxy resin. Each test piece embedded in the epoxy resin is cut in parallel with a thickness direction using a microtome (ULTRACUT-S, Leica microsystems) to obtain thin film pieces. ss section of each thin film piece is observed with an optical microscope, and the central thickness of the resin substrate film is measured. The arithmetic average of the 40 measured values is taken as the average thickness of the resin substrate film. In the method for measuring the average thickness of the resin substrate film, when an easily adhesive layer to be described later is disposed on at least one surface of the resin substrate film, and the thickness of the easily adhesive layer is smaller than the resolution of the optical microscope (specifically, the thickness of the easily adhesivelayer is 0.1 µm or less), the total value of the thickness of the easily adhesive layer and the thickness of the resin substrate film may be regarded as the thickness of the resin substrate film.

A maximum value $T1_{max}$ and a minimum value $T1_{min}$ of a thickness of the resin substrate film measured in a peripheral edge portion of the resin substrate film satisfy a relationship of $T1_{max}-T1_{min} \leq 12$ µm. $T1_{max}$ and $T1_{min}$ satisfy the relationship of $T1_{max}-T1_{min} \leq 12$ µm, whereby he uniformity of the distances between the separators can be improved when the resin substrate film is applied to the fuel cell stack. "$T1_{max}-T1_{min}$" can be adjusted by, for example, a temperature condition or a stretching condition in the manufacturing process of the resin substrate film.

$T1_{max}$ and $T1_{min}$ preferably satisfy a relationship of $T1_{max}-T1_{min} \leq 10$ µm, and more preferably satisfy a relationship of $T1_{max}-T1_{min} \leq 8$ µm, from. the viewpoint of improving the uniformity of the distances between the separators. The lower limit of "$T1_{max}-T1_{min}$" is not limited. $T1_{max}$ and $T1_{min}$ may satisfy, for example, a relationship of 0 µm$\leq T1_{max}-T1_{min}$.

$T1_{max}$ and $T1_{min}$ are each measured by the following method. In a plan view, from each section which divides a line (hereinafter, referred to as "inner peripheral line" in this paragraph) passing through a point inwardly spaced by 5 mm the outer periphery of the laminated body for fuel cell into 40 equal parts, a central portion (length: 5 mm, width: 5 mm) of the inner peripheral line is cut out to obtain 40 test pieces. Each test piece is fixed in an embedding capsule, and then embedded in an epoxy resin. Each test piece embedded in the epoxy resin is cut in parallel with a thickness direction using a microtome (ULTRACUT-S, Leica microsystems) to obtain thin film pieces. The cross section of each thin film piece is observed with an optical microscope, and the central thickness of the resin substrate film is measured. A maximum value of the 40 measured values is taken as $T1_{max}$. A minimum value of the 40 measured values is taken as $T1_{min}$. In the measurement methods of $T1_{max}$ and $T1_{min}$, when an easily adhesive layer to be described later is disposed on at least one surface of the resin substrate film, and the thickness of the easily adhesive layer is smaller than the resolution of the optical microscope (specifically, the thickness of the easily adhesive layer is 0.1 µm or less), the total value of the thickness of the easily adhesive layer and the thickness of the resin substrate film may be regarded as the thickness of the resin substrate film.

A maximum value $T2_{max}$ and a minimum value $T2_{min}$ of an average value of thicknesses of the resin substrate film measured at every 10 adjacent points in the peripheral edge portion of the resin substrate film satisfy a relationship of $T2_{max}-T2_{min} \leq 6$ µm. $T2_{max}$ and $T2_{min}$ satisfy the relationship of $T2_{max}-T2_{min}—6$ µm, whereby the uniformity of the distances between the separators can be improved when the resin substrate film is applied to the fuel cell st "$T2_{max}-T2_{min}$" can be adjusted by, for example, a temperature condition or a stretching condition in the manufacturing process of the resin substrate film.

$T2_{max}$ and $T2_{min}$ preferably satisfy a relationship of $T2_{max}-T2_{min} \leq 5$ µm, and more preferably satisfy a relationship of $T2_{max}-T2_{min} \leq 4$ µm, from the viewpoint of improving the uniformity of the distances between the separators. The lower limit of "$T2_{max}-T2_{min}$" limited. $T2_{max}$ and $T2_{min}$ may satisfy, for example, a relationship of $0 \, \mu m \leq T2_{max}-T2_{min}$.

$T2_{max}$ and $T2_{min}$ are each measured by the following method. In a plan view, from each section which divides a line (hereinafter, referred to as "inner peripheral line" in this paragraph) passing through a point inwardly spaced by 5 mm from the outer periphery of the laminated body for fuel cell into 40 equal parts, a central portion (length: 5 mm, width: 5 mm) of the inner peripheral line is cut out to obtain 40 test pieces. Each test piece is fixed in an embedding capsule, and then embedded in an epoxy resin. Each test piece embedded in the epoxy resin is cut in parallel with a thickness direction using a microtome (ULTRACUT-S, Leica microsystems) to obtain thin film pieces. The cross section of each thin film piece is observed with an optical microscope, and the central thickness of the resin substrate film is measured. Based on the 40 measured values, an arithmetic average of the measured values at every 10 adjacent points along the inner peripheral line is obtained. A maximum value of the four average values is taken as $T2_{max}$. A minimum value of the four average values is taken as $T2_{min}$. In the measurement methods of $T2_{max}$ and $T2_{min}$, when an easily adhesive layer to be described later is disposed on at least one surface of the resin substrate film, and the thickness of the easily adhesive layer is smaller than the resolution of the optical microscope (specifically, the thickness of the easily adhesive layer is 0.1 µm or less), the total value of the thickness of the easily adhesive layer and the thickness of the resin substrate film may be regarded as the thickness of the resin substrate film.

In the present disclosure, from the viewpoint of suitably joining the peripheral edge portion of the opening portion of the laminated body for fuel cell and the peripheral edge portion of the MEA to each other, a maximum value and a minimum value $T4_{min}$ of a thickness of the resin substrate film measured in a peripheral edge portion of a maximum opening portion in the opening portion preferably satisfy a relationship of $T4_{maxr}-T4_{min} \leq 10$ µm, and more preferably satisfy a relationship of $T4_{max}-T4_{min} \leq 8$ µm.

Figure 2:
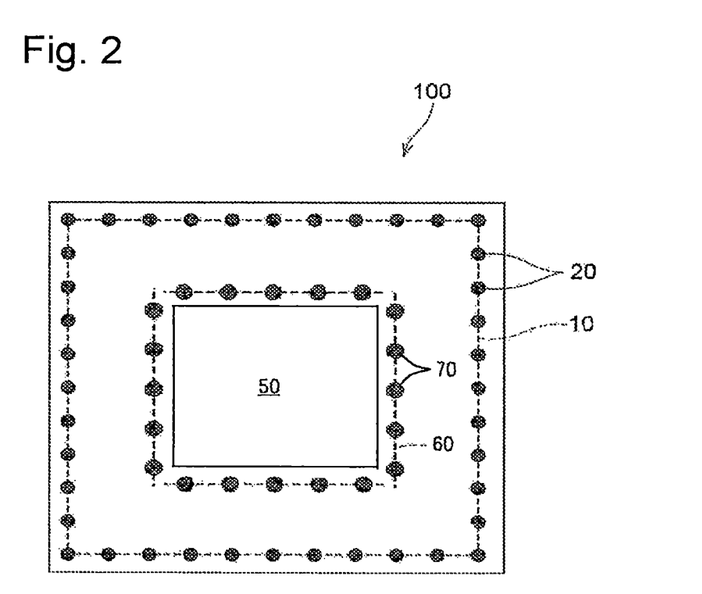
FIG. 2 is a plan view showing another example of the laminated body for fuel cell according to the present disclosure.

The maximum value $T4_{max}$ and the minimum value $T4_{min}$ are each measured by the following method. FIG. 2 is a plan view showing another example of the laminated body for fuel cell according to the present disclosure. As shown FIG. 2, in a plan view, from each section which divides an outer peripheral line 60 as a line passing through point outwardly spaced by 5 mm from an opening portion 50 of the laminated body for fuel cell into 20 equal parts, a central portion 70 (length: 5 mm, width: 5 mm) of the outer peripheral line 60 is cut out to obtain 20 test pieces. Each test piece is fixed in an embedding capsule, and then embedded in an epoxy resin. Each test piece embedded in the epoxy resin is cut in parallel with a thickness direction using a microtome (ULTRACUT-S, Leica microsystems) to obtain thin film pieces. The cross section of each thin film piece is observed with an optical microscope, and the central thickness of the resin substrate film is measured. A maximum value of the 20 measured values is taken as $T4_{max}$. A minimum value of the 20 measured values is taken as $T4_{min}$. In the method for measuring $T4_{max}$ and $T4_{min}$, when an easily adhesive layer to be described later is disposed on at least one surface of the resin substrate film, and the thickness of the easily adhesive layer is smaller than the resolution of the optical microscope (specifically, the thickness of the easily adhesive layer is 0.1 µm or less), the total value of the thickness of the easily adhesive layer and the thickness of the resin substrate film may be regarded as the thickness of the resin substrate film.

From the viewpoint of suitably joining the peripheral edge portion of the opening portion of the laminated body for fuel cell and the peripheral edge portion of the MEA to each other, a maximum value $T5_{max}$ and a minimum value $T5_{min}$ of an average value of thicknesses of the resin substrate film measured at every 5 adjacent points preferably satisfy a relationship of $T5_{max}-T5_{min} \leq 5$ µm, and more preferably satisfy a relationship of $T5_{max}-T5_{min} \leq 4$ µm.

The maximum value $T5_{max}$ and the minimum value $T5_{min}$ are each measured by the following method. After 20 test pieces are obtained in the same manner as in the case of the maximum value $T4_{max}$ and the minimum value $T4_{min}$, the central thickness of the resin substrate film is measured. Based on the 20 measured values, an arithmetic average of the measured values at every 5 adjacent points along an outer peripheral line is obtained. A maximum value of the four average values is taken as $T5_{max}$. A minimum value of the four average values is taken as $T5_{min}$.

In the present disclosure, from the viewpoint of suitably joining the peripheral edge portion of the opening portion of the laminated body for fuel cell and the peripheral edge portion of the MEA to each other while improving the uniformity of the distances between the separators, a difference between an average value $T1_{ave}$ of an outer peripheral edge portion of the resin substrate film and an average value $T4_{ave}$ of a peripheral edge portion of the maximum opening portion is preferably $|T1_{ave}-T4_{ave}| \leq 5$ µm, and more preferably $|T1_{ave}-T4_{ave}| \leq 4$ µm.

The average value $T4_{ave}$ of the peripheral edge portion of the opening portion is an arithmetic average of 20 measured values in the method for measuring $T4_{max}$ and $T4_{min}$. The average value $T1_{ave}$ of the outer peripheral edge portion of the resin substrate film is an arithmetic average of 40 measured values in the method for measuring the maximum value $T1_{max}$ and the minimum value $T1_{min}$. That is, the average value $T1_{ave}$ of the outer peripheral edge portion is the same value as the average thickness of the resin substrate film.

[Resin Component]

A resin constituting the resin substrate film is not limited, and may be determined depending on the storage Blastic modulus of the intended resin substrate film.

The glass transition temperature (Tg) of the resin constituting the resin substrate film is preferably 80° C. or higher, more preferably 90° C. or higher, and particularly preferably 100° C. or higher. The glass transition temperature of the resin constituting the resin substrate film is 80° C. or higher, whereby adhesiveness between the heat seal layer and the resin substrate film in a wet heat environment can be improved. The upper limit of the glass transition temperature of the resin constituting the resin substrate film is not limited. The glass transition temperature of the resin constituting the resin substrate film may be determined, for example, within the range of 200° C. or lower.

The glass transition temperature is measured by the following method. 10 mg of a sample is sealed within an aluminum measuring pan. The aluminum pan is mounted in a differential scanning calorimeter (DSC Model Q100 manufactured by TA Instruments). The temperature is increased from 25° C. to 300° C. at a rate of 20° C./min, and was held at 300° C. for 5 min. Then, the aluminum pan is removed therefrom and quenched by cooling on a metal plate. The aluminum pan is again mounted in the differential scanning calorimeter. The temperature is increased from 25° C. at a rate of 20° C./min to measure the glass transition temperature. The glass transition temperature is taken as an extrapolated start temperature.

The resin constituting the resin substrate film is preferably a thermoplastic resin. Examples of the thermoplastic resin include polyesters (for example, polyethylene naphthalate and polyethylene terephthalate), polystyrene, and polyphenyPlene sulfide.

The resin substrate film is preferably a polyester film, a polystyrene film, or a polyphenylene sulfide film from the viewpoint of chemical resistance, wet heat resistance, and mechanical properties, and is preferably a polyethylene naphthalate film, a polystyrene film, a polyphenylene sulfide film, or a polyethylene terephthalate film. The polystyrene film is preferably made of syndiotactic polystyrene from the viewpoint of heat resistance. In the present disclosure, a resin substrate film having a specific resin component name means that the resin substrate film contains a specific resin component in an amount of 90% by mass or more (preferably 95% by mass or more) with respect to the total mass of the resin substrate film. For example, the "polyester film" means a film containing a polyester in an amount of 90% by mass or more (preferably 95% by mass or more) with respe t to the total mass of the film. The upper limit of the content of the resin component is not limited. The content of the resin component may be determined within a range of 100% by mass or less.

The resin substrate film is preferably a polyester film, and more preferably a polyethylene naphthalate film, from the viewpoint of mechanical properties and wet heat resistance.

The polyethylene naphthalate is preferably polyethylene-2,6-naphthalate or polyethylene-2,7-naphthalate, and more preferably polyethylene-2,6-naphthalate.

Constituent units containing an ester bond in the polyester may be used alone or in combination of two or more thereof. That is, the polyester is not limited to a copolymer of a single polycarboxylic acid and a single polyhydric alcohol, and may be a copolymer formed of three or more monomers. Examples of a copolymerization component in the copolymer formed of three or more monomers include a dicarboxylic acid, an oxycarboxylic acid, and a dihydric alcohol.

Examples of the dicarboxylic acid include oxalic acid, adipic acid, phthalic acid, sebacic acid, dodecanecarboxylic acid, isophthalic acid, terephthalic acid, 1,4-cyclohexanedicarboxylic acid, 4,4'-diphenyldicarboxylic acid, phenylindanedicarboxylic acid, 2,6-naphthalenedicarboxylic acid (when the main polymer is not polyethylene-2,6-naphthalate), 2,7-naphthalenedicarboxylic acid (when the main polymer is not polyethylene-2,7-naphthalate), tetralin dicarboxylic acid, decalin dicarboxylic acid, and diphenyl ether dicarboxylic acid.

Examples of the oxycarboxylic acid include p-oxybenzoic acid and p-oxyethoxybenzoic acid.

Examples of the dihydric alcohol include propylene glycol, trimethylene glycol, tetramethylene glycol, hexamethylene glycol, cyclohexamethylene glycol, neopentyl glycol, an ethylene oxide adduct of bisphenol sulfone, an ethylene oxide adduct of bisphenol A, diethylene glycol, and polyethylene glycol.

The above-described compounds may be used alone or in combination of two or more thereof.

In the above-described copolymerization component of the polyester, the acid component is preferably at least one compound selected from the group consisting of isophthalic acid, terephthalic acid, 4,4'-diphenyldicarboxylic acid, 2,6-naphthalenedicarboxylic acid, 2,7-naphthalenedicarboxylic acid, and p-oxybenzoic acid. The glycol component is preferably at least one compound selected from the group consisting of trimethylene glycol, hexamethylene glycol, neopentyl glycol, and an ethylene oxide adduct of bisphenol sulfone.

Among the above, it is preferable that the polyester is a polyester mainly composed of polyethylene-2,6-naphthalate from the viewpoint of mechanical properties and wet heat resistance. Here, "mainly composed of polyethylene-2,6-naphthalate" means that the content of an ethylene-2,6-naphthalate unit with respect to all constituent units of the polyester is 90 mol % or more (preferably 95 mol % or more). The upper limit of the content of the ethylene-2,6-naphthalate unit is not limited The content of the ethylene-2,6-naphthalate unit with respect to all the constituent units of the polyester may be determined, for example, in a range of 100 mol % or less.

[Additives]

The resin substrate film may contain a filler as necessary from the viewpoint of improvement in lubricity, and the like as long as the object of the present disclosure is not hindered. As the filler, those conventionally known as a lubricity imparting agent for a film such as a polyester film can be used. Examples of the filler include calcium carbonate, calcium oxide, aluminum oxide, kaolin, silicon oxide, zinc oxide, carbon black, silicon carbide, tin oxide, crosslinked acrylic resin particles, crosslinked polystyrene resin particles, melamine resin particles, and crosslinked silicon resin particles.

The resin substrate film may contain additives such as a coloring agent, an anti-static agent, an antioxidant, an organic lubricant, and a catalyst.

[Production Method]

Each of the resin substrate film and the resin used as a raw material of the resin substrate film can be produced by known methods. Hereinafter, a method for producing a resin substrate film using a polyester as an example of the resin will be described. A resin substrate film using a resin other than a polyester can be produced with reference to the following method.

(Method for Producing Polyester)

Examples of a method for producing a polyester include a method in which a polyester having a low degree of polymerization is directly obtained by the reaction of a glycol with a carboxylic acid (for example, terephthalic acid and naphthalenedicarboxylic acid), and a method in which a lower alkyl ester of a dicarboxylic acid is reacted with a glycol using a transesterification catalyst, followed by performing polymerization in the presence of a polymerization catalyst.

Examples of the transesterification catalyst include compounds containing sodium, potassium, magnesium, calcium, zinc, strontium, titanium, zirconium, manganese, or cobalt. The transesterification catalysts may be used alone or in combination of two or more thereof.

Examples of the polymerization catalyst include antimony compounds (for example, antimony trioxide and antimony pentoxide), germanium compounds (for example, germanium dioxide), and titanium compounds (for example, tetraethyl titanate and a partial hydrolysate thereof, tetrapropyl titanate and a partial hydrolysate thereof, tetraphenyl titanate and a partial hydrolysate thereof, titanyl ammonium oxalate, titanyl potassium oxalate, and titanium trisacetylacetonate).

When polymerization is performed via the transesterification reaction, a phosphorous compound may be added before the polymerization reaction for the purpose of deactivating the transesterification catalyst. Examples of the phosphorus compound include trimethyl phosphate, triethyl phosphate, tri-n-butyl phosphate, and orthophosphoric acid ($H_3PO_4$). The content of a phosphor element in the polyester is preferably 20 ppm by mass to 100 ppm by mass from the viewpoint of the thermal stability of the polyester.

The polyester may be formed into chips after melt polymerization, and subjected to solid phase polymerization with application of heat under reduced pressure or in a stream of inert gas (for example, nitrogen)

The intrinsic viscosity (35° C., orthochlorophenol) of the polyester constituting the resin substrate film is preferably 0.40 dl/g or more, and more preferably 0.40 dl/g to 0.90 dl/g. When the intrinsic viscosity is too low, operations tend to easily be interrupted. When the intrinsic viscosity is too high, the melt viscosity tends high, whereby melt-extruding tends to be difficult, and a polymerization time tends to be long. When the intrinsic viscosity is too low, hydrolysis resistance also tends to decrease.

<Method for Producing Polyester Film>

The polyester film can be produced, for example, by the following method. The polyester is melt-extruded into a sheet, and then cooled and solidified by a casting drum to form an un-stretched film. The un-stretched film is stretched in a machine direction (forming machine axial direction; also referred to as machine direction or MD) once, or two or more times, at Tg+60° C. so that total stretching corresponds to a factor of 3 times to 6 times, and stretched in a transverse direction (direction perpendicular to the film forming machine axial direction and to a thickness direction; also referred to as transverse direction or TD) once, or two or more times, at Tg to Tg+60° C. so that total stretching corresponds to a factor of 3 times to 5 times. The stretched film can be heat-treated as necessary for 1 to 60 seconds at Tm−80° C. to Tm−20° C. Furthermore, the stretched film can be heat-treated again as necessary while being contracted by 0% to 20% in the transverse direction at a temperature which is 10° C. to 20° C. lower than a heat treatment temperature. In the present paragraph, "Tg" represents the glass transition temperature (° C.) of the polyester which serves as a raw material of the resin substrate film. In the present paragraph, "Tm" represents the melting point (° C.) of the polyester which serves as a raw material of the resin substrate film. The above stretching may be sequential biaxial stretching or may be simultaneous biaxial stretching.

(Elimination of Thickness Unevenness)

The resin substrate film can be produced by a conventionally known melt extrusion method, and in that case, thickness unevenness can be eliminated by the following method.

Specifically, in the case of a polyester resin, examples of the method include a method in which resin composition pellets are supplied to an extruder and a molten resin is extruded from a slit die such as a T-die, and a method in which a vent device is set in an extruder to which resin composition pellets are supplied and a molten resin is similarly extruded from a slit die such as a T-die while moisture and various gas components generated are discharged during melt extrusion. At this time, variation in thickness in the transverse direction can be reduced by adjusting the temperatures of heaters provided at regular intervals in the die of the extruder.

The molten resin extruded from the slit die is cast, and cooled and solidified. A method for cooling to solidness may be any conventionally known method, but a method in which a molten resin is cast onto a rotating cooling roll to form a sheet is suitably used.

The surface temperature of the cooling roll is preferably set within the range of (Tg−100)° C. to (Tg+20)° C., and more preferably within the range of (Tg−70)° C. to (Tg−5)° C. with respect to the glass transition temperature (Tg) of the polyester constituting the resin composition.

When the surface temperature of the cooling roll exceeds the upper limit, the molten resin may adhere to the roll fore its solidification. When the surface temperature of the cooling roll is less than the lower limit, the molten resin may be solidified too rapidly and slips on the surface of the roll, whereby the flatness of the obtained sheet may be impaired, or the thickness unevenness may be increased.

When the molten resin is cast onto the cooling roll, a metal wire is set in the vicinities of the position on the cooling roll where the molten resin lands, and an electrostatic field is generated by flowing a current to charge the resin, whereby the adhesiveness of the molten resin to the metal surface of the cooling roll is enhanced. The above means is also effective from the viewpoint of eliminating the thickness unevenness of the film to improve the flatness of the film. At that time, a method in which an electrolytic substance is added into the resin composition as long as the gist of the present invention is not exceeded, to enhance the adhesiveness of the resin composition is also particularly effective for eliminating the thickness unevenness.

<<Heat Seal Layer>>

The laminated body for fuel cell according to the present disclosure includes a heat seal layer disposed on each of both surfaces of a resin substrate film. In the present disclosure, the "heat seal layer" means a thermally fusing layer.

The compositions of the heat seal layers disposed on both surfaces of the resin substrate film may be the same or different.

The heat seal layer preferably contains a resin.

Examples of the resin include a polyolefin. The resin is preferably a polyolefin, and more preferably polypropylene, from the viewpoint of the adhesiveness of the heat seal layer to an adherend (for example, metal).

The polyolefin is not limited as long as the polyolefin is a polymer having a constituent unit derived from an olefin, and known polyolefins can be used. The polyolefin may be an olefin homopolymer, a copolymer of two or more olefins, or a copolymer of an olefin and a monomer other than the olefin.

Examples of the polyolefin include a homopolymer of an olefin having 2 to 8 carbon atoms, a copolymer of an olefin having 2 to 8 carbon atoms, and a copolymer of an olefin having 2 to 8 carbon atoms and other monomer. Specific examples of the polyolefin include polyethylene, polypropylene, polyisobutylene, poly(1-butene), poly-4-methylpentene, polyvinylcyclohexane, polystyrene, poly(p-methylstyrene), poly(α-methvlstyrene), an α-olefin copolymer, an ethylene-vinyl acetate copolymer, an ethylene-acrylic acid copolymer, an ethylene-methyl methacrylate copolymer, an ethylene-vinyl acetate-methyl methacrylate copolymer, and an ionomer resin. The polyolefin may be a chlorinated polyolefin obtained by chlorinating the polyolefin as described above.

Examples of the polyethylene include high-density polyethylene (HDPE), low-density polyethylene (LDPE), and linear low-density polyethylene.

Examples of the α-olefin copolymer include an ethylene-propylene block copolymer, an ethylene-propylene random copolymer, an ethylene-1-butene copolymer, an ethylene-4-methyl-1-pentene copolymer, and an ethylene-hexene copolymer.

The polyolefin preferably has a functional group from the viewpoint of the adhesiveness of the heal seal layer to an adherend (for example, metal). Examples of the functional group include a carboxy group, a group having a carboxylic acid anhydride structure, and a hydroxy group (hereinafter, may be referred to as "hydroxyl group"). Examples of the group having a carboxylic acid anhydride structure include a group having a maleic anhydride structure and a group having a phthalic anhydride structure.

From the viewpoint of the adhesiveness of the heal seal layer to an adherend (for example, metal), the functional group contained in the polyolefin is preferably at least one functional group selected from the gr up consisting of a carboxy group, a group having a carboxylic acid anhydride structure, and a hydroxy group, more preferably at least one functional group selected from the group consisting of a carboxy group and a group having a carboxylic acid anhydride structure, and particularly preferably at least one functional group selected from the group consisting of a carboxy group and a group having a maleic anhydride structure.

The polyolefin is also preferably a polyolefin into which a functional group is introduced (hereinafter, may be referred to as "modified polyolefin") from the viewpoint of the adhesiveness of the heal seal layer to an adherend (for example, metal). The modified polyolefin is preferably modified polypropylene. Examples of the functional group contained in the modified polyolefin include the functional groups described above.

From the viewpoint of the adhesiveness of the heal seal layer to an adherend (for example, metal), the modified polyolefin preferably has at least one functional group selected from the group consisting of a carboxy group, a group having a carboxylic acid anhydride structure, and a hydroxy group, more preferably has at least one functional group selected from the group consisting of a carboxy group and a group having a carboxylic acid anhydride structure, and particularly preferably has at least one functional group selected from the group consisting of a carboxy group and a group having a maleic anhydride structure.

From the viewpoint of the adhesiveness of the heal seal layer to an adherend (for example, metal) and resistance to an electrolyte, the modified polyolefin is preferably at least one modified polyolefin selected from the group consisting of a modified polyolefin having an acid value of 1 mgKOH/g to 200 mgKOH/g (hereinafter, sometimes referred to as "acid-modified polyolefin") and a modified polyolefin having a hydroxyl value of I mgKOH/a to 200 mgKOH/g (hereinafter, may be referred to as "hydroxyl group-modified polyolefin"), and more preferably a modified polyolefin having an acid value of 1 mgKOH/a to 200 mgKOH/g.

The acid value indicates the number of milligrams of potassium hydroxide required to neutralize an acid contained in 1 g of a sample. The acid value is measured in accordance with "JIS K 0070: 1992". Specifically, a precisely weighed sample is dissolved in a mixed solvent having a mass ratio of mixed xylene:n-butanol=1:1 to obtain a sample solution. Next, to this sample solution, a few drops of 1 w/v % phenolphthalein solution in ethanol are added as an indicator. Using a 0.1 mol/L potassium hydroxide solution in ethyl alcohol as a titrant, titration is carried out. The acid value is calculated according to the following formula.

In the following formula, T represents a titration amount (mL); F represents a factor of a titrant; and W represents a sampled amount (g).

$$\text{acid value} = (T \times F \times 56.11 \times 0.1)/W \qquad \text{Formula:}$$

The hydroxyl value is measured in accordance with "JIS K 0070: 1992".

The acid-modified polyolefin preferably has at least one functional group selected from the group consisting of a carboxy group and a group having a carboxylic acid anhydride structure, and particularly preferably has at least one functional group selected from the group consisting of a carboxy group and a group having a maleic anhydride structure.

Examples of the acid-modified polyolefin include maleic anhydride-modified polypropylene, an ethylene-(meth)acrylic acid copolymer, an ethylene-acrylic acid ester-maleic anhydride terpolymer, and an ethylene-methacrylic acid ester-maleic anhydride terpolymer.

The acid-modified polyolefin can be produced, example, by graft-modifying or copolymerizing a polyolefin using at least one polymerizable ethylenically unsaturated carboxylic acid or a derivative thereof. Examples of the polyolefin to be modified include the above-mentioned polyolefins. Preferred examples of the polyolefin to be modified include a propylene homopolymer, a copolymer of propylene and α-olefin, an ethylene homopolymer, and a copolymer of ethylene and α-olefin.

The acid-modified polyolefin is available, for example, as "MODIC" (registered trademark) manufactured by Mitsubishi Chemical Corporation, "ADMER" (registered trademark) manufactured by Mitsui Chemicals, Inc., "UNISTOLE" (registered trademark) manufactured by Mitsui Chemicals, Inc., "TOYO-TAC" (registered trademark) manufactured by Toyokasei Co., Ltd., "UMEX" (registered trademark) manufactured by Sanyo Chemical, Ltd., "REXPEARL EAA" manufactured by Japan Polyethylene Corporation, "REXPEARL ET" manufactured by Japan Polyethylene Corporation, "PRIMACOL" manufactured by Dow Chemical, "NUCREL" manufactured by Dow-Mitsui Polychemicals Company, Ltd., and "BONDINE" (registered trademark) manufactured by Arkema.

The hydroxyl group-modified polyolefin is a polyolefin having a hydroxyl group in the molecule.

The hydroxyl group-modified polyolefin can be synthesized, for example, by graft-modifying or copolymerizing a polyolefin using hydroxyl group-containing (meth) acrylic acid ester or hydroxyl group-containing vinyl ether.

Examples of the hydroxyl group-containing (meth)acrylic acid ester include hydroxyethyl (meth) acrylate, hydroxypropyl (meth) acrylate, glycerol (meth) acrylate, lactone-modified hydroxyethyl (meth) acrylate, polyethylene glycol (meth)acrylate, and polypropylene glycol (meth) acrylate.

Examples of the hydroxyl group-containing vinyl ether include 2-hydroxyethyl vinyl ether, diethylene glycol monovinyl ether, and 4-hydroxybutyl vinyl ether.

The melting point (Tm) of the resin is not limited. The melting point (Tm) of the resin is preferably 80° C. or higher, more preferably 90° C. or higher, and particularly preferably 100° C. or higher, from the viewpoint of heat resistance during use. The melting point (Tm) of the resin is preferably 200° C. or lower, more preferably 180° C. or lower, and particularly preferably 160° C. or lower, from the viewpoint of improving adhesiveness between the heat seal layer and the resin substrate film.

The melting point (Tm) of the resin is measured by the following method. 10 mg of a sample is sealed within an aluminum measuring pan. The aluminum pan is mounted in a differential scanning calorimeter (DSC Model Q100 manufactured by TA Instruments). The temperature is increased from 25° C. to 200° C. at a rate of 20° C./min to measure a melting point (Tm: ° C.).

The heat seal layer may contain one resin alone or two or more resins.

The content of the resin in the heat seal layer is preferably 90% by mass or more, more preferably 95% by mass or more, and particularly preferably 98% by mass or more, with respect to the total mmss of the heat seal layer, from the viewpoint of the adhesiveness of the heat seal layer to an adherend (for example, metal). The upper limit of the content of the resin in the heat seal layer is rot limited. The content of the resin in the heat seal layer may be determined, for example, within the range of 100% by mass or less.

The heat seal layer may contain other components in addition to the resin without departing from the gist of the present disclosure. Examples of the other components include a filler and a crosslinking agent. The heat seal layer may contain one other component alone, or may contain two or more other components.

The heat seal layer has an average thickness of 25 µm to 100 µm. The average thickness of the heat seal layer is within the above range, whereby the adhesiveness of the heat seal layer to an adherend (for example, metal) can be improved. The average thickness of the heat seal layer is preferably 25 µm. to 100 µm, more preferably 30 µm to 90 µm, and particularly preferably 35 µm to 80 µm. The average thickness of the heat seal layer is measured by a method according to the method for measuring the average thickness of the resin substrate film. The average thickness of the heat seal layers disposed on both surfaces of the resin substrate film may be the same or different.

The total value of the average thickness of the resin substrate film and the average thickness of the heat seal layer is preferably 80 µm to 500 µm, more preferably 100 µm to 450 µm, and particularly preferably 120 µm to 400 µm. The total value of the average thickness of the resin substrate film and the average thickness of the heat seal layer is within the above range, whereby the uniformity of the distances between the separators can be improved.

The method for forming the heat seal layer is not limited, and can appropriately selected from commonly used methods. For example, by melt-kneading a composition for forming a heat seal layer (hereinafter, referred to as "heat sealant"), followed by extrusion molding, the heat seal layer can be formed on the resin substrate film. Examples of the extrusion molding include a co-extrusion method and an extrusion lamination method.

Examples of a method for eliminating the thickness unevenness of the heat seal layer include a roll coating method. Specifically, the method is a method in which a composition for forming a heat seal layer is melt-kneaded, and a molten resin extrudedfrom a slit die such as a T-die is thermocompression-bonded onto a resin substrate film. The surface material, surface roughness, and roll temperature of a roll used for compression-bonding are controlled to eliminate thickness unevenness, whereby a laminated body having good flatness can be obtained.

For example, by using a material having smaller adhesiveness to the composition for forming the heat seal layer as the surface material of the roll, the surface properties after coating are improved, whereby the thickness unevenness can also be eliminated. The adhesiveness between the composition for forming the heat seal layer and the surface of the roll is affected by the roll temperature, whereby the appropriate control of the roll temperature is also effective as the method for eliminating the thickness unevenness.

A maximum value $T3_{max}$ and a minimum value $T3_{min}$ of a thickness of the heat seal layer measured in a peripheral edge portion of the heat seal layer preferably satisfy a relationship of $T3_{max}-T3_{min} \leq 10$ µm, more preferably satisfy a relationship of $T3_{max}-T3_{min} \leq 9$ µm, and particularly preferably satisfy a relationship of $T3_{max}-T3_{min} \leq 8$ µm. The maximum value $T3_{max}$ and $T3_{min}$ satisfy the relationship of $T3_{max}-T3_{min} \leq 10$ µm, whereby the uniformity of the distances between the separators can be improved when the heat seal layer is applied to the fuel cell stack. The lower limit of "$T3_{max}-T3_{min}$" is not limited $T3_{max}$ and $T3_{min}$ may satisfy, for example, a relationship of $0$ µm$\leq T3_{max}-T3_{min}$. "$T3_{max}-T3_{min}$" can also be adjusted by, for example, a temperature condition or a stretching condition in the production process of the resin substrate film.

$T3_{max}$ and $T3_{min}$ are each measured by the following method. In a plan view, from each section which divides a line (hereinafter, referred to as "inner peripheral line" in this paragraph) passing through a point inwardly spaced by 5 mm from the outer periphery of the laminated body for fuel cell into 40 equal parts, a central portion (length: 5 mm, width: 5 mm) of the inner peripheral line is cut out to tain 40 test pieces. Each test piece is fixed in an embedding capsule, and then embedded in an epoxy resin. Each test piece embedded in the epoxy resin is cut in parallel with a thickness direction using a microtome (ULTRACUT-S, Leica microsystems) to obtain thin film pieces. The cross section of each thin film piece is observed with an optical microscope, and the central thickness of the heat seal layer is measured. A maximum value of the 40 measured values is taken as $T3_{max}$. A minimum value of the 40 measured values is taken as $T3_{min}$.

The heat sealant can be produced by a known method. For example, the heat sealant can be produced by mixing a resin and, as necessary, other components using a mixing device. Examples of the mixing device include a Henschel mixer, a Banbury mixer, a V-type blender, a tumbler blender, and a ribbon blender. The heat sealant may be produced in the form of pellets by melt-kneading a resin and, as necessary, other components at 180° C. to 300° C. (preferably 190 to 260° C.) using a single screw extruder, a multi-screw extruder, a roll, or a kneader.

<<Easily Adhesive Layer>>

The laminated body for fuel cell according to the present disclosure may include an easily adhesive layer on at least one surface of the resin substrate film. The laminated body for fuel cell according to the present disclosure includes the easily adhesive layer on at least one surface of the resin substrate film, whereby adhesiveness between the heat sealant and the resin substrate film can be improved. The laminated body for fuel cell according to the present disclosure may include the easily adhesive layer on each of both surfaces of the resin substrate film.

The easily adhesive layer preferably contains a binder resin. The binder resin may be a homopolymer, a copolymer, or a mixture of two or more polymers (polymer blend). The binder resin may be crosslinked with a crosslinking agent. Examples of the binder resin include a thermoplastic resin and a thermosetting resin. Specific examples of the binder resin include polyester, polyimide, polyamide, polyesteramide, polyvinyl chloride, poly (meth)acrylic acid ester, polyurethane, polyvinyl chloride, polystyrene, and polyolefin. Among the above, the binder resin is preferably polyester, polyimide, poly (meth)acrylic acid ester, or polyurethane.

The easily adhesive layer may contain one binder resin or two or more binder resins.

The content of the binder resin is preferably 80% by mass or more, and more preferably 90% by mass or more, with respect to the total mass of the easily adhesive layer. The upper limit of the content of the binder resin is not limited. The content of the binder resin may be determined within the range of, for example, 100% by mass or less with respect to the total mass of the easily adhesive layer.

The average thickness of the easily adhesive layer is preferably 5 nm to 200 nm, more preferably 10 nm to 180 nm, and particularly preferably 15 nm to 160 nm, from the viewpoint of improving adhesiveness between heat seal layer and the resin substrate film. The average thickness of the easily adhesive layer is measured by a method according to the method for measuring the average thickness of the resin substrate film.

Examples of the method for forming the easily adhesive layer include a lamination method and a coating method. The coating method may be extruded resin coating or molten resin coating.

The method for forming the easily adhesive layer is preferably a method using a coating liquid. For example, the easily adhesive layer can be formed by applying the coating liquid to the resin substrate film.

The coating liquid can be prepared, for example, by mixing a binder resin and a solvent. Examples of the solvent include an organic solvent and water. Examples of the organic solvent include toluene, ethyl acetate, and methyl ethyl ketone.

The coating liquid may contain one solvent or two or more solvents.

The coating liquid preferably contains a component constituting the coating layer and a chemically inert surfactant from the viewpoint of promoting the wetting of the coating liquid with respect to the resin substrate film.

Examples of the surfactant include an anionic surfactant and a nonionic surfactant. Specific examples of the surfactant include polyoxyethylene alkyl phenyl ether, polyoxyethylene-fatty acid ester, sorbitan fatty acid ester, glycerin fatty acid ester, fatty acid metal soap, alkyl sulfate salt, alkyl sulfonate salt, and alkyl sulfosuccinate salt.

The content of the surfactant is preferably 1% by mass to 10% by mass with respect to the total solid content mass of the coating liquid. When the tent of the surfactant is within the above range, the surface tension of the coating liquid can be reduced 40 mN/m or less, whereby the cissing of the coating uid can be prevented.

The coating liquid may contain an additive other than the above components. Examples of the additive include a resin other than the binder resin (for example, melamine resin), an anti-static agent, and a coloring agent. Examples of the additive include a flexible polymer, a filler, a heat stabilizer, a weather stabilizer, an antiaging agent, a leveling agent, an anti-static agent, a slipping agent, an antiblocking agent, an antifogging agent, a dye, a pigment, a natural oil, a synthetic oil, wax, an emulsion, a bulking agent, a curing agent, and a flame retardant.

The solid content concentration of the coating liquid is usually 1% by mass to 20% by mass, and preferably 1% by mass to 10% by mass. When the solid content concentration of the coating liquid is less than 1% by mass, the wetting of the coating liquid with respect to the resin substrate film tends to be insufficient. When the solid content concentration of the coating liquid exceeds 20% by mass, the stability or coating external appearance of the coating liquid tends to deteriorate.

A method for applying the coating liquid is not limited, and a known method can be used. Examples of the method for applying the coating liquid include a roll coating method, a gravure coating method, a roll brushing method, a spray coating method, an air knife coating method, an impregnation method, and a curtain coating method. In the method for applying the coating liquid, one of the methods may be used alone, or two or more thereof may be used in combination.

The coating liquid can be applied to the resin substrate film at any stage. The coating liquid is preferably applied to the resin substrate film in the production process of the resin substrate film, and more preferably applied to the resin substrate film before the completion of oriented crystallization thereof. Here, the phrase "resin substrate film before the completion of oriented crystallization thereof" includes an un-stretched film, a uniaxially stretched film obtained by orienting an un-stretched film in any one of a machine direction and a transverse direction, and a biaxially stretched film oriented by stretching an un-stretched film at low stretching factors in both a machine direction and a transverse direction (the film is limited to a biaxially stretched film before restretching in a machine direction or a transverse direction and completing the oriented crystallization thereof). Among the above, the coating liquid is preferably applied to the un-stretched film or the uniaxially stretched film. It is preferable that the coating liquid is applied to the un-stretched film or the uniaxially stretched film, and the un-stretched film or the uniaxially stretched film is then subjected to longitudinal stretching and/or transverse stretching and heat setting.

When the coating liquid is applied to the resin substrate film, the surface of the resin substrate film ie preferably subjected to a physical treatment (for example, corona surface treatment, flame treatment, and plasma treatment) as a preliminary treatment for improving application property.

<<Thickness>>

The average thickness of the laminated body for fuel cell according to the present disclosure is preferably 80 μm to 500 μm, more preferably 100 μm to 450 μm, and particularly preferably 120 μm to 400 μm. The average thickness of the laminated body for fuel cell is within the above range, whereby the uniformity of the distances between the separators can be improved. The average thickness of the laminated body for fuel cell is measured by a method according to the method for measuring the average thickness of the resin substrate film.

A maximum value $T6_{mxa}$ and a minimum value $T6_{min}$ of the thickness of the laminated body for fuel cell measured in the peripheral edge portion of the laminated body for fuel cell preferably satisfy a relationship of $T6_{max}-T6_{min} \leq 26$ μm, more preferably a relationship of $T6_{max}-T6_{min} \leq 24$ μm, and particularly preferably a relationship of $T6_{max}-T6_{min} \leq 22$ μm. $T6_{max}$ and $T6_{min}$ satisfy the relationship of $T6_{max}-T6_{min} \leq 26$ μm, whereby the uniformity of the distances between the separators can be improved when the laminated body is applied to the fuel cell stack. The lower limit "$T6_{max}-T6_{min}$" is not limited. $T6_{max}$ and $T6_{min}$ may satisfy, for example, a relationship of $0 \text{ μm} \leq T6_{max}-T6_{min}$.

$T6_{max}$ and $T6_{min}$ are each measured by the following method. In a plan view, from each section which divides a line (hereinafter, referred to as "inner peripheral line" in this paragraph) passing through a point inwardly spaced by 5 mm from the outer periphery of the laminated body for fuel cell into 40 equal parts, a central portion (length: 5 mm, width: 5 mm) of the inner peripheral line is cut out to obtain 40 test pieces. Each test piece is fixed in an embedding capsule, and then embedded in an epoxy resin. Each test piece embedded in the epoxy resin is cut in parallel with a thickness direction using a microtome (ULTRACUT-S, Leica microsystems) to obtain thin film pieces. The cross section of each thin film piece is observed with an optical microscope, and the central thickness of the laminated body for fuel cell measured. A maximum value of the 40 measured values is taken as $T6_{max}$. A minimum value of the 40 measured values is taken as $T6_{min}$.

A maximum value $T7_{max}$ and a minimum value $T7_{min}$ average value of thicknesses of the laminated body for fuel cell measured at every 10 adjacent points in the peripheral edge portion of the laminated body for fuel cell preferably satisfy a relationship of $T7_{max}-T7_{min} \leq 8$ µm, more preferably satisfya relationship $T7_{max}-T7_{min} \leq 6$ µm, and particularly preferably satisfy a relationship of $T7_{max}-T7_{min} \leq 4$ µm. $T7_{max}$ and $T7_{min}$ satisfy a relationship of $T7_{max}-T7_{min} \leq 10$ µm, whereby the uniformityof the distances between the separators can be improved when the laminated bo is applied to the fuel cell stack. The lower limit of "$T7_{max}-T7_{min}$" is not limited. $T7_{max}$ and $T7_{min}$ may satisfy, for example, a relationship of $0\mu m \leq T7_{max}-T7_{min}$.

$T7_{max}$ and $T7_{min}$ are each measured by the following method. In a plan view, from each section which divides a line (hereinafter, referred to as "inner peripheral line" in this paragraph) passing through a point inwardly spaced by 5 mm from the outer periphery of the laminated body for fuel cell into 40 equal parts, a central portion (length: 5 mm, width: 5 mm) of the inner peripheral line is cut out to obtain 40 test pieces. Each test piece is fixed in an embedding capsule, and then embedded in an epoxy resin. Each test piece embedded in the epoxy resin is cut in parallel with a thickness direction using a microtome (ULTRACUT-S, Leica microsystems) to obtain thin film pieces. The cross section of each thin film piece is observed with an optical microscope, and the central thickness of the laminated body for fuel cell is measured. Based on the 40 measured values, an arithmetic average of the measured values at every 10 adjacent points along the inner peripheral line is obtained. A maximum value of the four average values is taken as $T7_{max}$. A minimum value of the average values is taken as $T7_{min}$.

<<Shape>>

The shape of the laminated body for fuel cell according to the present disclosure is not limited, and may be determined depending on the shape of the intended fuel cell. The shape of the laminated body for fuel cell according to the present disclosure is preferably a flat plate shape from the viewpoint of increasing the capacity of the fuel cell stack. Here, the "flat plate shape" means having two main planes.

<Long Laminated Body>

A long laminated body according to the present disclosure is a long laminated body used for manufacturing a laminated body for fuel cell, wherein, when a laminated body for fuel cell having a width of 100 nm and a length of 100 mm is cut out from a center position in transverse direction. (a distance between a position in a machine direction and a winding end is, for example, 1 m), the laminated body for fuel cell constitutes the laminated body for fuel cell according to the present disclosure. When a plurality of laminated bodies for fuel cell having a width of 100 mm and a length of 100 mm are cut out over a region of 80% or more in the transverse direction, all the laminated bodies for fuel cell preferably constitute the laminated body for fuel cell according to the present disclosure, and more preferably constitute the laminated bo for fuel cell according to the present disclosure over a region of 90% or more in the transverse direction.

The long laminated body is usually in the form of a roll and has a constant width. The width of the long laminated body is, for example, 0.2 to 10.0 m, and preferably 0.3 to 5.0 m.

EXAMPLES

Hereinafter, the present disclosure will be de ribed in detail by way of Examples. However, the present disclosure is not limited to Examples.

[Measuring Method]

The following items were measured by the following methods.

(Glass Transition Temperature (Tg))

10 mg of a sample was sealed within an aluminum measuring pan. The aluminum pan was mounted in a differential scanning calorimeter (DSC Model Q100 manufactured by TA Instruments). The temperature was increased from 25° C. to 300° C. at a rate of 20° C./min, and was held at 300° C. for 5 min. Then, the aluminum pan was removed therefrom and quenched by cooling on a metal plate. The aluminum pan was again mounted in the differential scanning calorimeter. The temperature was increased from 25° C. at a rate of 20° C./min to measure a glass transition temperature. The glass transition temperature was taken as an extrapolated start temperature.

(Storage Elastic Modulus)

The resin substrate film was cut to prepare a test piece (width: 5 mm, length: 35 mm). Using a dynamic viscoelasticity measuring device (for example, DMA8000, PerkinElmer Japan Co., Ltd.), the temperature was increased from 20° C. to 30° C. at a frequency of 1 Hz at 1° C./min to measure dynamic viscoelasticity. From the measurement results, a storage elastic modulus at room temperature of 25° C. was obtained.

(Average Thickness)

In a plan view, from each section which divides a line (hereinafter, referred to as "inner peripheral line" in this paragraph) passing through a point inwardly spaced by 5 mm from the outer periphery of the laminated body for fuel cell into 40 equal parts, a central portion (length: 5 mm, width: 5 mm) of the inner peripheral line was cut out to obtain 40 test pieces. Each test piece was fixed in an embedding capsule, and then embedded in an epoxy resin. Each test piece embedded in the epoxy resin was cut in parallel with a thickness direction using a microtome (ULTRACUT-S, Leica microsystems) to obtain thin film pieces. The cross section of each thin film piece was observed with an optical microscope, and the central thickness of the object to measured was measured. The arithmetic average of the 40 measured values was taken as the average thickness. In the measurement of the average thickness of the resin substrate film, when the easily adhesive layer was disposed on at least one surface of the resin substrate film, the total value of the thickness of the easily adhesive layer and the thickness of the resin substrate film was regardedas the thickness of the resin substrate film.

(Thickness Unevenness A1 of Resin Substrate Film)

The thickness unevenness A1 of the resin substrate film is a value calculated by the formula represented by "$T1_{max}-T1_{min}$" described above. $T1_{max}$ and and $T1_{min}$ were each measured by the following method. In a plan view, from each section which divides a line (hereinafter, referred to as "inner peripheral line" in this paragraph) passing through a point inwardly spaced by 5 mm from the outer periphery of the laminated body for fuel cell into 40 equal parts, a central portion (length: 5 mm, width: 5 mm) of the inner peripheral line was cut out to obtain 40 test pieces. Each test piece was fixed in an embedding capsule, and then embedded in an epoxy resin. Each test piece embedded in the epoxy resin was cut in parallel with a thickness direction using a microtome (ULTRACUT-S, Leica microsystems) to obtain thin film pieces. The cross section of each thin film piece was observed with an optical microscope, and the central thickness of the resin substrate film was measured. A maximum value of the 40 measured values was taken as $T1_{max}$. A minimum value of the 40 measured values was taken as $T1_{min}$. In the measurement of $T1_{max}$ and $T1_{min}$, when the easily adhesive layer was disposed on at least one surface of the resin substrate film, the total value of the thickness of the easily adhesive layer and the thickness of the resin substrate film was regarded as the thickness of the resin substrate film.

(Thickness Unevenness A2 of Heat Seal Layer)

The thickness unevenness A2 of the heat seal layer is a value calculated by the formula represented by "$T2_{max}$-$T3_{min}$" described above. $T3_{max}$ and $T3_{min}$ were measured with "T1" replaced with "T3" and the "resin substrate film" replaced with the "heat seal layer" in the method for measuring the thickness unevenness A1 of the resin substrate film (excluding portions describing that the total value of the thickness of the easily adhesive layer and the thickness of the resin substrate film was regarded as the thickness of the resin substrate film).

(Thickness Unevenness A3 of Laminated B or Fuel Cell)

The thickness unevenness A3 of the laminated body for fuel cell is a value calculated by the formula represented by "$T6_{max}$-$T6_{min}$" described above. $T6_{max}$ and $T6_{min}$ were measured with "T1" replaced wth "T6" and the "resin substrate film" replaced with the "laminated body for fuel cell" in the method for measuring the thickness unevenness A1 of the resin substrate film.

(Thickness Unevenness B1 of Resin Substrate Film)

The thickness unevenness B1 of the resin substrate film is a value calculated by the formula represented by "$T2_{max}$-$T_{min}$". $T2_{max}$ and $T2_m$, were each measured by the following method. In a plan view, from each section which divides a line (hereinafter, referred to as "inner peripheral line" in this paragraph) passing through a point inwardly spaced by 5 mm from the outer periphery of the laminated body for fuel cell into 40 equal parts, a central portion (length: 5 mm, width: 5 mm) of the inner peripheral line was cut out to a.otain 40 test pieces. Each test piece was fixed in an embedding capsule, and then embedded in an epoxy resin. Each test piece embedded in the epoxy resin was cut in parallel with a thickness direction using a microtome (ULTRACUT-S, Leica microsystems) to obtain thin film pieces. The cross section of each thin film piece was observed with an optical microscope, and the central thickness of the resin substrate film was measured. Based on the 40 measured values, an arithmetic average of the measured values at every 10 adjacent points along the inner peripheral line was obtained. A maximum value of the four average values was taken as $T2_{max}$. A minimum value of the four average values was taken as $T2_{min}$. In the measurement of $T2_{max}$ and $T2_{min}$, when the easily adhesive layer was disposed on at least one surface of the resin substrate film, the total value of the thickness of the easily adhesive layer and the thickness of the resin substrate film was regarded as the thickness of the resin substrate film.

(Thickness Unevenne of Laminated Body or Fuel Cell)

The thickness unevenness B2 of the laminated body for fuel cell is a value calculated by the formula represented by "$T7_{max}$-$T7_{min}$" described above. $T7_{max}$ and $T7_{min}$ were measured with "T2" r laced with "T7" and the "resin substrate film" replaced with the "laminated body for fuel cell" in the method for measuring the thickness unevenness B1 of the resin substrate film.

Example 1

(Preparation of Laminated Body)

Polyethylene-2,6-naphthalate having an intrinsic viscosity of 0.60 dl/g (35° C., orthochlorophenol) (obtained using manganese acetate tetrahydrate as a transesterification catalyst and antimony trioxide as a polymerization catalyst, and shown as "PEN" in Table 1) as a resin was dried with a dryer at 170° C. for 6 hours, and then charged into an extruder. The resin was melt-kneaded at a melting temperature of 300° C., extruded through a die slit at 300° C., and then cooled and solidified on a casting drum set at a surface temperature of 25° C. to prepare an un-stretched film. In the preparation of the un-stretched film, the temperatures of heaters provided at regular intervals in a die of the extruder were adjusted so that the thickness unevenness A1 of the resin substrate film after stretching was 8 μm and the thickness unevenness B1 of the resin substrate film after stretching was 3 μm.

The un-stretched film was guided to a group of rolls heated to 140° C., stretched by a factor of 3.3 times in a machine direction, and cooled by a group of rolls at 25° C. A coating liquid containing 100 parts by mass of an acrylic copolymer resin (trade name: RX-7770 manufactured by Nippon Carbide Co., Ltd.) as an easy adhesive agent, 2 parts by mass of a crosslinking agent (trade name: Denacol EX-313 manufactured by Nagase ChemteX Corporation), 6 parts by mass of a crosslinking agent (trade name: TETRAD-X manufactured by Mitsubishi Gas Chemical Co., Inc.), and 8 parts by mass (based on 100 parts by mass of the total solid content other than the surfactant) of a surfactant (trade name: SANNONIC SS-70 manufactured by Sanyo Chemical Industries, Ltd.) was applied to both surfaces of the film after longitudinal stretching by a roll coater method. The application amount of the coating liquid was adjusted so that the thickness of an easily adhesive layer in a film to be finally obtained was 40 nm. The film was guided into a tenter while both ends of the film were held by clips, where the film was stretched by a factor of 3.5 times in a transverse direction in an atmosphere heated to 135° C. In the tenter, heat setting was performed at 230° C. The film was relaxed by 1% in a transverse direction at 230° C., and then uniformly cooled slowly to room temperature to obtain a biaxially stretched film (average thickness: 125 μm).

A heat seal layer was formed on the easily adhesive layer disposed on each of both surfaces of the biaxially stretched film to obtain a laminated body. Using Admer QE840 (polyolefin manufactured by Mitsui Chemicals, Inc.) as a heat sealant for forming the heat seal layer, the heat seal layer was formed by an extrusion lamination method. The obtained heat seal layers each had an average thickness of 50 μm. The temperatures of the heaters provided at regular intervals in the die of the extruder were adjusted so that the thickness unevenness A2 of the heat seal layer was 4 μm.

(Preparation of Cell)

A laminated body (width: 100 mm, length: 100 mm) was disposed between two steel plates (width: 100 mm, length: 100 mm, thickness: 250 μm), followed by thermocompression-bonding with a thermal press machine to obtain a cell. A steel plate having the same size and thickness as those cf the separator was used as an alternative to the separator, and was subjected to alternative evaluation, but the same results could be obtained even when the separator was used.

(Preparation of Stack)

100 cells were prepared, and the obtained 100 cells were laminated to obtain a stack.

Examples 2 to 8

Laminated bodies, cells, and stacks were obtained by the same procedure as that in Example 1 except that, in the step of producing an un-stretched film, the temperatures of heaters provided at regular intervals in a die of an extruder were adjusted so that the thickness unevennesses A1 and B1 of a resin substrate film were values described in Table 1, and in the step of producing a heat seal layer, the temperatures of heaters provided at regular intervals in a die of an extruder were adjusted so that the thickness unevenness A2 of the heat seal layer was a value described in Table 1.

Example 9

A laminated body, a cell, and a stack were prepared by the same procedure as that in Example 1 except that the biaxially stretched film used in Example 1 was changed to a biaxially stretched film prepared by the following method.

A resin composition was obtained by mixing the following components.

(1) Polystyrene having a weight average molecular weight of $3.0 \times 10^5$ and observed to have a nearly complete syndiotactic structure by $^{13}$C-NMR measurement (Tg: 91° C., Tm: 270° C., shown as "SPS" in Table 1.): 70 parts by mass (2) Poly(2,6-dimethyl-1,4-phenylene)ether (intrinsic viscosity measured in chloroform: 0.32 dl/g, Tg: 210° C.): 30 parts by mass (3) Pentaerythritol trakis[3-(3,5-di-t-butyl-4-hydroxyphenyl)propionate] (antioxidant, trade name: IRGANOX 1010 manufactured by BASF Japan Ltd., Tm: 120° C., thermal decomposition temperature: 335° C.): 2 parts by mass (4) Mixture of porous silica particles and silicone oil (1 part by mass of a silicone oil (linear dimethylpolysiloxane, KF-96-100CS, manufactured by Shin-Etsu Chemical Co., Ltd.) was sprayed onto 100 parts by mass of porous silica particles (average particle size: 1.7 µm, compression ratio: 66%, pore volume: 1.5 mL/g, pore average diameter: 10 nm), followed by putting in a mixer and stirring, to obtain the mixture): 0.1 parts by mass The resin composition was dried at 120° C. for 3 hours, and then supplied into an extruder. The resin composition was melt-kneaded at 300° C., extruded through a die slit, and then cooled and solidified on a casting drum cooled to 50° C. to prepare an un-stretched sheet. The un-stretched sheet was stretched by a factor of 3.0 times in a machine direction (machine axial direction) at 140° C. guided to a tenter, and then stretched by a factor of 3.0 times in a transverse direction (direction perpendicular to the machine axial direction and to a thickness direction) at 145° C. Subsequently, the sheet was heat-set at 250° C. for 60 seconds, and relaxed by 2% in the transverse direction while being cooled to 180° C. to obtain a biaxially stretched film (average thickness: 125 µm).

Example 10

A laminated body, a cell, and a stack were prepared by the same procedure as that in Example 1 except that the biaxially stretched film used in Example 1 was changed to a biaxially stretched film prepared by the following method.

Diphenyl disulfide was added to diiodinated benzene and sulfur, followed by heating to 180° C. to completely melt and mix the components. Then, the temperature was increased to 220° C., and the pressure was decreased to 200 Torr. The obtained mixture was subjected to a polymerization reaction for 8 hours while the temperature and the pressure were gradually changed so that a final temperature was 320° C. and a final pressure was 1 Torr. A resin composition containing polyphenylene sulfide (Tg: 90° C., Tm: 285° C., number average molecular weight: 12,000, weight average molecular weight: 42,000, shown as "PPS" in Table 1) was obtained by the above procedure.

The obtained resin composition was dried at 170° C. for 4 hours, then melt-extruded at 290° C. using an extruder, extruded from a die having a linear lip, and cast on a metal drum having a surface kept at 25° C. to be cooled and solidified, thereby obtaining an un-stretched film. The un-stretched film was transversely stretched by a factor 4 times at a final temperature of 105° C. using a tenter, heat-treated at 265° C. for 15 seconds in a subsequent heat treatment chamber in the tenter, and then relaxed by 3% at 170° C. in a transverse direction to obtain a biaxially stretched film (average thickness: 125 µm). In the transverse stretching, the step of transverse stretching was divided into three stages (first zone, second zone, and third zone). The stretching in the first zone was performed at a factor of 1.78 times at a temperature of 95° C. The stretching in the second zone was performed at a factor of 1.5 times at a temperature of 100° C. The stretching in the third zone was performed at a factor of 1.5 times at a temperature of 105° C. The stretching ratio of each zone is the ratio of the outlet width to the inlet width of each zone.

Example 11

A cell and a stack were prepared by the same procedure as that in Example I except that the biaxially stretched film used in Example 1 was changed to a biaxially stretched film prepared by the following method.

Polyethylene terephthalate having an intrinsic viscosity of 0.64 dl/g (35° C., orthochlorophenol) (obtained using manganese acetate tetrahydrate as a transesterification catalyst and antimony trioxide as a polymerization catalyst, and shown as "PET" in Table 1) as a resin was dried with a dryer at 170° C. for 3 hours, and then charged into an extruder. The resin was melt-kneaded at a melting temperature of 280° C., extruded through a die slit at 280° C., and then cooled and solidified on a casting drum set at a surface temperature of 25° C. to prepare an un-stretched film. The un-stretched film was guided to a group of rolls heated to 95° C., stretched by a factor of 3.3 times in a machine direction, and cooled by a group of rolls at 25° C.

A coating liquid containing 100 parts by mass of an acrylic copolymer resin (trade name: RX-7770 manufactured by Nippon Carbide Co., Ltd.) as an easy adhesive agent, 2 parts by mass of a crosslinking agent (trade name: Denacol EX-313 manufactured by Nagase ChemteX Corporation), 6 parts by mass of a crosslinking agent (trade name: TETRAD-X manufactured by Mitsubishi Gas Chemical Co., Inc.), and 8 parts by mass (based on 100 parts by mass of the total solid content other than the surfactant) of a surfactant Grade name: SANNONIC SS-70 manufactured by Sanyo Chemical Industries, Ltd.) was applied to both surfaces of the film after longitudinal stretching by a roll coater method. The application amount of the coating liquid was adjusted so that the thickness of an easily adhesive layer in a film to be finally obtained was 40 nm. The film was guided into a tenter while both ends of the film were held by clips, where the film was stretched by a factor of 3.3 times in a transverse direction in an atmosphere heated to 110° C. In the tenter, heat setting was performed at 220° C. for 40 seconds. The film was relaxed by 1% in a transverse direction at 190° C., and then uniformly cooled slowly to room temperature to obtain a biaxially stretched film (average thickness: 125 μm).

Comparative Examples 1 to 3

Laminated bodies, cells, and stacks were obtained by the same procedure as that in Example 1 except that, in the step of producing an un-stretched film, the temperatures of heaters provided at regular intervals in a die of an extruder were adjusted so that the thickness unevennesses A1 and B1 of a resin substrate film were values described in Table 1, and in the step of producing a heat seal layer, the temperatures of heaters provided at regular intervals in a die of an extruder were adjusted so that the thickness unevenness A2 of the heat seal layer was a value described in Table 1.

Comparative Example 4

A laminated body, a cell, and a stack were prepared by the same procedure as that in Example 1 except that the biaxially stretched film used in Example 1 was changed to a silicon rubber sheet (trade name: Silicosheet BA manufactured by Shin-Etsu Polymer Co., Ltd., average thickness: 300 μm).

[Evaluation]

The cells and stacks prepared in the above Examples and Comparative Examples were evaluated as follows. However, in the evaluation of the adhesive strength, cells prepared by changing the dimensions of the steel sheet and the dimensions of the laminated body were used. Specifically, cells used for evaluation of adhesive strength were prepared by the same method as the method for producing each cell described above except that two steel sheets (width: 300 mm, length: 300 mm, thickness: 100 μm) and a laminated body (width: 300 mm, length: 300 mm) were used.

(Adhesive Strength)

In a plan view, a line passing through a point inwardly spaced by 5 mm from the outer periphery of the cell was divided into 8 equal parts, and a line passing through the center of the cell was set as a reference line. The cell was cut along lines parallel with the reference line and passing through positions spaced by 5 mm from the reference line on left and right sides. In the cut pieces, a region including the reference line and extending from the outer periphery to the center of the cell was taken as a section to subjected to a peeling test (hereinafter, may be referred to as "section" in this paragraph). There are eight sections in total. Three test pieces (width: 10 mm, length: 30 mm) were cut out from each section. The end portion of each of the steel sheets disposed on both surfaces of the test piece was peeled off, and the steel sheet was then peeled off by 180° at a peeling rate of 100 mm/min according to JIS L151 using a tensile tester (Tensilon, UCT-100, manufactured by Orientec Co., Ltd.). That is, three test pieces were subjected to a peeling test per section. In the target section, the maximum value of the adhesive strength of each test piece was obtained, and the average value of the maximum values (hereinafter, referred to as "peeling force") was then obtained. Evaluation was performed according to the following criteria based on the minimum value of the peeling forces of the eight sections.

—Criteria—
A: Peeling force is 15 N /10 mm or more.
B: Peeling force is 5 N/10 mm or more and less than 15 N/10 mm.
C: Peeling force is less than 5 N/10 mm.

(Cross-Sectional Observation)

From the stack, 25 th, 50 th, and 75 th cells were extracted, and each of the cells was cut in a thickness direction. The cross-sectional shape of each of the cells was visually observed, and evaluated according to the following criteria based on a gap distance between the two steel plates (hereinafter, simply referred to as "gap distance").

—Criteria—
A: The gap distance is uniform in each of the cells, which causes no difference in the gap distance among the three cells.
B: The gap distance is uniform in each of the cells, but there is a difference in the gap distance among the three cells.
C: The gap distance is not uniform in each of the cells, which causes a difference in the gap distance among the three cells.

(Thickness Unevenness C)

In a plan view, in each section which divides a line (hereinafter, referred to as "inner peripheral line" in this paragraph) passing through a point inwardly spaced by 5 mm from the outer periphery of the stack into 40 equal parts, the thickness of a center point of the inner peripheral line was measured. For the measurement of the thickness, an M-shaped caliper (530-109, N30) manufactured by Mitutoyo Corporation was used. A difference between the maximum value and the minimum value (maximum value-minimum value) of the 40 measured values was taken as thickness unevenness C.

(Thickness Unevenness D)

In a plan view, in each section which divides a line (hereinafter, referred to as "inner peripheral line" in this paragraph) passing through a point inwardly spaced by 5 mm from the outer periphery of the stack into 40 equal parts, the thickness of a center point of the inner peripheral line was measured. For the measurement of the thickness, an M-shaped caliper (530-109, N30) manufactured by Mitutoyo Corporation was used. Based the 40 measured values, an arithmetic average of the measured values at every 10 adjacent points along the inner peripheral line was obtained. A differenc tween the maximum value and the minimum value (maximum value-minimum value) of the four average values was taken as thickness unevenness D.

TABLE 1

| | Resin substrate film (a) | | | | | Heat seal layer (b) | | | |
| --- | --- | --- | --- | --- | --- | --- | --- | --- | --- |
| | Resin | Storage elastic modulus (MPa) | Tg (° C.) | Average thickness (μm) | Thickness unevenness A1 (μm) | Thickness unevenness B1 (μm) | Resin | Average thickness (μm) | Thickness unevenness A2 (μm) | Laminated body Configuration |
| Example 1 | PEN | 5,000 | 160 | 125 | 8 | 3 | Admer QE840 | 50 | 4 | b/a'/b |
| Example 2 | PEN | 5,000 | 160 | 125 | 10 | 4 | Admer QE840 | 50 | 5 | b/a'/b |

TABLE 1-continued

| | | | | | | | | | |
|---|---|---|---|---|---|---|---|---|---|
| Example 3 | PEN | 5,000 | 160 | 75 | 8 | 4 | Admer QE840 | 50 | 4 | b/a'/b |
| Example 4 | PEN | 5,000 | 160 | 75 | 11 | 4 | Admer QE840 | 50 | 5 | b/a'/b |
| Example 5 | PEN | 5,000 | 160 | 250 | 9 | 3 | Admer QE840 | 50 | 4 | b/a'/b |
| Example 6 | PEN | 5,000 | 160 | 250 | 11 | 4 | Admer QE840 | 50 | 5 | b/a'/b |
| Example 7 | PEN | 5,000 | 160 | 125 | 8 | 3 | Admer QE840 | 50 | 10 | b/a'/b |
| Example 8 | PEN | 5,000 | 160 | 125 | 8 | 3 | Admer QE840 | 50 | 3 | b/a'/b |
| Example 9 | SPS | 2,500 | 105 | 125 | 6 | 3 | Admer QE840 | 50 | 4 | b/a/b |
| Example 10 | PPS | 4,000 | 130 | 125 | 10 | 4 | Admer QE840 | 50 | 5 | b/a/b |
| Example 11 | PET | 3,000 | 120 | 125 | 8 | 3 | Admer QE840 | 50 | 4 | b/a'/b |
| Comparative Example 1 | PEN | 5,000 | 160 | 125 | 15 | 5 | Admer QE840 | 50 | 5 | b/a'/b |
| Comparative Example 2 | PEN | 5,000 | 160 | 75 | 16 | 4 | Admer QE840 | 50 | 5 | b/a'/b |
| Comparative Example 3 | PEN | 5,000 | 160 | 125 | 10 | 8 | Admer QE840 | 50 | 5 | b/a'/b |
| Comparative Example 4 | Silicon rubber | 10 | — | 300 | 35 | 15 | Admer QE840 | 50 | 4 | b/a/b |

| | Laminated body | | | | Stack | | |
|---|---|---|---|---|---|---|---|
| | Average thickness (μm) | Thickness unevenness A3 (μm) | Thickness unevenness B2 (μm) | Cell Adhesive strength | Thickness unevenness C (mm) | Thickness unevenness D (mm) | Cross-sectional observation |
| Example 1 | 225 | 14 | 4 | A | 0.5 | 0.2 | A |
| Example 2 | 225 | 17 | 4 | A | 0.5 | 0.2 | A |
| Example 3 | 175 | 13 | 3 | A | 0.4 | 0.1 | A |
| Example 4 | 175 | 18 | 4 | A | 0.6 | 0.2 | A |
| Example 5 | 350 | 15 | 3 | A | 0.5 | 0.2 | A |
| Example 6 | 350 | 17 | 3 | A | 0.6 | 0.2 | A |
| Example 7 | 225 | 26 | 7 | A | 0.9 | 0.5 | B |
| Example 8 | 225 | 12 | 3 | A | 0.4 | 0.1 | A |
| Example 9 | 225 | 14 | 2 | A | 0.4 | 0.1 | A |
| Example 10 | 225 | 18 | 3 | A | 0.6 | 0.2 | A |
| Example 11 | 225 | 14 | 3 | A | 0.5 | 0.2 | A |
| Comparative Example 1 | 225 | 26 | 8 | B | 1.2 | 1.0 | C |
| Comparative Example 2 | 175 | 26 | 9 | B | 1.3 | 1.1 | C |
| Comparative Example 3 | 225 | 22 | 6 | B | 1.1 | 1.0 | C |
| Comparative Example 4 | 400 | 45 | 15 | B | 1.6 | 1.5 | C |

In Table 1, "configuration" represents the layer configuration of the laminated body. In Table 1, "a" described in the column of "configuration" represents the resin substrate film including no easily adhesive layer. In Table 1, "a'" described in the column of "configuration" represents the resin substrate film having the easily adhesive layer on each of both surfaces. In Table 1, "b" described in the column of "configuration" represents the heat seal layer.

From Table 1, the uniformity of the distances between the separators in the stack of each of Example 1 to 11 was found to be more excellent than that in the stack of each of Comparative Examples 1 to 4. The adhesive strength of the cell of each of Examples 1 to 11 was found to be more excellent than that in the cell of each of Comparative Examples 1 to 4.

INDUSTRIAL APPLICABILITY

The laminated body for fuel cell according to the present disclosure has excellent uniformity of the distances between the separators when applied to the fuel cell stack, whereby the laminated body for fuel cell can be suitably used for the fuel battery cell and the fuel cell stack.

DESCRIPTION OF REFERENCE SIGNS

10 Inner peripheral line
20 Central portion
50 Opening portion
60 Outer peripheral line of peripheral edge portion of opening portion
70 Center portion of outer peripheral line
100 Laminated nody for fuel cell

The invention claimed is:
1. A laminated body for a fuel cell having an outer peripheral shape corresponding to an outer peripheral shape of a fuel battery cell, the laminated body comprising:
a resin substrate film and
a heat seal layer disposed on each of both surfaces of the resin substrate film, wherein
the resin substrate film has a storage elastic modulus of 2,000 MPa to 8,000 MPa,
the resin substrate film has an average thickness of 30 µm to 300 µm,
a maximum value $T1_{max}$ and a minimum value $T1_{min}$ of a thickness of the resin substrate film measured in a peripheral edge portion of the resin substrate film satisfy a relationship of $T1_{max1} - T1_{min} \leq 12$ µm,
a maximum value $T2_{max}$ and a minimum value $T2_{min}$ of an average value of thicknesses of the resin substrate film measured at every 10 adjacent points in the peripheral edge portion of the resin substrate film satisfy a relationship of $T2_{max} - T2_{min} \leq 6$ µm, and
the heat seal layer has an average thickness of 25 µm to 100 µm.

2. The laminated body for a fuel cell according to claim 1, wherein a total value of an average thickness of the resin substrate film and an average thickness of the heat seal layer is 80 µm to 500 µm.

3. The laminated body for a fuel cell according to claim 1, wherein a maximum value $T3_{max}$ and a minimum value $T3_{min}$ of a thickness of the heat seal layer measured in a peripheral edge portion of the heat seal layer satisfy a relationship of $T3_{max} - T3_{min} \leq 8$ µm.

4. The laminated body for a fuel cell according to claim 1, wherein the laminated body has a planar shape having at least one opening portion on an inner side, wherein the at least one opening portion has a total area of 30 to 90% of the area of the outer peripheral shape.

5. The laminated body for a fuel cell according to claim 4, wherein
a maximum value $T4_{max}$ and a minimum value $T4_{min}$ of a thickness of the resin substrate film measured in a peripheral edge portion of a maximum opening portion in the opening portion satisfy a relationship of $T4_{max} - T4_{min} \leq 10$ µm,
a maximum value $T5_{max}$ and a minimum value $T5_{min}$ of an average value of thicknesses of the resin substrate film measured at every 5 adjacent points satisfy a relationship of $T5_{max} - T5_{min} \leq 5$ µm, and
a difference between an average value $T1_{ave}$ of an outer peripheral edge portion of the resin substrate film and an average value $T4_{ave}$ of the peripheral edge portion of the maximum opening portion is $|T1_{ave} - T4_{ave}| \leq 5$ µm.

6. The laminated body for a fuel cell according to claim 1, wherein the resin substrate film is a polyethylene naphthalate film, a polystyrene film, a polyphenylene sulfide film, or a polyethylene terephthalate film.

7. The laminated body for a fuel cell according to claim 1, wherein the heat seal layer contains a polyolefin.

8. A laminated film roll for manufacturing the laminated body according to claim 1, the laminated film roll comprising:
a resin substrate film and
a heat seal layer disposed on each of both surfaces of the resin substrate film, wherein
the resin substrate film has a storage elastic modulus of 2,000 MPa to 8,000 MPa,
the resin substrate film has an average thickness of 30 µm to 300 µm,
a maximum value $T1_{max}$ and a minimum value $T1_{min}$ of a thickness of the resin substrate film measured in a peripheral edge portion of the resin substrate film satisfy a relationship of $T1_{max} - T1_{min} \leq 12$ µm,
a maximum value $T2_{max}$ and a minimum value $T2_{min}$ of an average value of thicknesses of the resin substrate film measured at every 10 adjacent points in the peripheral edge portion of the resin substrate film satisfy a relationship of $T2_{max} - T2_{min} \leq 6$ µm, and
the heat seal layer has an average thickness of 25 µm to 100 µm,
wherein at least one portion of the laminated film roll having a width of 100 mm and a length of 100 mm is cut out from a center position in a transverse direction.

9. The laminated film roll of claim 8, wherein a total value of an average thickness of the resin substrate film and an average thickness of the heat seal layer is 80 µm to 500 µm.

10. The laminated film roll of claim 8, wherein a maximum value $T3_{max}$ and a minimum value $T3_{min}$ of a thickness of the heat seal layer measured in a peripheral edge portion of the heat seal layer satisfy a relationship of $T3_{max} - T3_{min} \leq 8$ µm.

11. The laminated film roll of claim 8, wherein the laminated body has a planar shape having at least one opening portion on an inner side, wherein the at least one opening portion has a total area of 30 to 90% of the area of the outer peripheral shape.

12. The laminated film roll of claim 11, wherein
a maximum value $T4_{max}$ and a minimum value $T4_{min}$ of a thickness of the resin substrate film measured in a peripheral edge portion of a maximum opening portion in the opening portion satisfy a relationship of $T4_{max} - T4_{min} \leq 10$ µm,
a maximum value $T5_{max}$ and a minimum value $T5_{min}$ of an average value of thicknesses of the resin substrate film measured at every 5 adjacent points satisfy a relationship of $T5_{max} - T5_{min} \leq 5$ µm, and
a difference between an average value $T1_{ave}$ of an outer peripheral edge portion of the resin substrate film and an average value $T4_{ave}$ of the peripheral edge portion of the maximum opening portion is $|T1_{ave} - T4_{ave}| \leq 5$ µm.

13. The laminated film roll of claim 8, wherein the resin substrate film is a polyethylene naphthalate film, a polystyrene film, a polyphenylene sulfide film, or a polyethylene terephthalate film.

14. The laminated film roll of claim 8, wherein the heat seal layer contains a polyolefin.

* * * * *

UNITED STATES PATENT AND TRADEMARK OFFICE
CERTIFICATE OF CORRECTION

PATENT NO. : 12,315,969 B2
APPLICATION NO. : 17/634152
DATED : May 27, 2025
INVENTOR(S) : Masahiro Kuragaki et al.

Page 1 of 1

It is certified that error appears in the above-identified patent and that said Letters Patent is hereby corrected as shown below:

On the Title Page

IN THE ABSTRACT:
At Line 11, -- $T2_{max}$ -- should be -- $T2_{min}$ --

In the Claims

At Claim 1, Column 29, Line 9, -- $T1_{maxl\text{-}T}1_{min} \leq 12$ μm -- should be -- $T1_{max}\text{-}T1_{min} \leq 12$ μm --

Signed and Sealed this
Twelfth Day of August, 2025

Coke Morgan Stewart
*Acting Director of the United States Patent and Trademark Office*